US009346673B2

(12) United States Patent
Noh et al.

(10) Patent No.: US 9,346,673 B2
(45) Date of Patent: May 24, 2016

(54) ELECTRODE FOR FUEL CELL, MEMBRANE-ELECTRODE ASSEMBLY FOR FUEL CELL COMPRISING THE SAME, FUEL CELL SYSTEM COMPRISING THE SAME, AND METHOD FOR PREPARING THE ELECTRODE

(75) Inventors: Hyung-Gon Noh, Suwon-si (KR); Hee-Tak Kim, Suwon-si (KR); Jong-Ki Lee, Suwon-si (KR); Ho-Jin Kweon, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1709 days.

(21) Appl. No.: 11/126,483

(22) Filed: May 11, 2005

(65) Prior Publication Data

US 2005/0287418 A1 Dec. 29, 2005

(30) Foreign Application Priority Data

Jun. 23, 2004 (KR) ........................ 10-2004-0047053
Jun. 30, 2004 (KR) ........................ 10-2004-0050773

(51) Int. Cl.

| | |
|---|---|
| ***B82Y 30/00*** | (2011.01) |
| ***H01M 4/86*** | (2006.01) |
| ***H01M 4/88*** | (2006.01) |
| ***H01M 4/92*** | (2006.01) |
| *H01M 8/10* | (2016.01) |

(52) U.S. Cl.

CPC ............. *B82Y 30/00* (2013.01); *H01M 4/8605* (2013.01); *H01M 4/8807* (2013.01); *H01M 4/8817* (2013.01); *H01M 4/8867* (2013.01); *H01M 4/926* (2013.01); *H01M 2008/1095* (2013.01); *Y02E 60/50* (2013.01)

(58) Field of Classification Search

None

See application file for complete search history.

(56) References Cited

U.S. PATENT DOCUMENTS

| | | | | |
|---|---|---|---|---|
| 4,293,396 | A | 10/1981 | Allen et al. | |
| 4,835,074 | A | 5/1989 | Bolster et al. | |
| 5,636,437 | A | 6/1997 | Kaschmitter et al. | |
| 5,879,827 | A * | 3/1999 | Debe et al. | 429/40 |
| 5,910,378 | A | 6/1999 | Debe et al. | |
| 6,287,717 | B1 | 9/2001 | Cavalca et al. | |
| 6,368,476 | B1 | 4/2002 | DeMarinis et al. | |
| 6,444,347 | B1 | 9/2002 | Ouvry et al. | |
| 6,589,682 | B1 | 7/2003 | Fleckner et al. | |
| 6,646,376 | B2 | 11/2003 | Yonehara et al. | |
| 6,686,308 | B2 | 2/2004 | Mao et al. | |
| 6,869,721 | B2 | 3/2005 | Imazato | |

(Continued)

FOREIGN PATENT DOCUMENTS

| | | |
|---|---|---|
| CN | 1278747 A | 1/2001 |
| CN | 1303525 | 7/2001 |

(Continued)

OTHER PUBLICATIONS

Patent Abstracts of Japan, Publication No. 2004-103592, dated Apr. 3, 2004, in the name of Shuichi Suzuki et al.

(Continued)

*Primary Examiner* — Barbara Gilliam
*Assistant Examiner* — Angela Martin
(74) *Attorney, Agent, or Firm* — Lewis Roca Rothgerber Christie LLP

(57) ABSTRACT

The electrode for a fuel cell of the invention includes: an electrode substrate; and a catalyst layer having a filler layer formed on the surface of the electrode substrate and a catalyst coating the filler layer.

16 Claims, 6 Drawing Sheets

100
105 {103, 102}
101

(56) References Cited

U.S. PATENT DOCUMENTS

| | | | | |
|---|---|---|---|---|
| 7,351,444 | B2 * | 4/2008 | Wang et al. | 427/115 |
| 2002/0061433 | A1 | 5/2002 | Kawamura et al. | |
| 2002/0127170 | A1 | 9/2002 | Hong et al. | |
| 2002/0146615 | A1 * | 10/2002 | Yamaura et al. | 429/44 |
| 2002/0175073 | A1 | 11/2002 | Nakamura et al. | |
| 2002/0177032 | A1 | 11/2002 | Suenaga et al. | |
| 2003/0086859 | A1 * | 5/2003 | Kawakami et al. | 423/447.1 |
| 2003/0118884 | A1 | 6/2003 | Hampden-Smith et al. | |
| 2004/0018416 | A1 * | 1/2004 | Choi et al. | 429/44 |
| 2004/0053111 | A1 * | 3/2004 | Matsumoto | 429/42 |
| 2004/0076870 | A1 | 4/2004 | Tanaka et al. | |
| 2004/0076871 | A1 * | 4/2004 | Gascoyne et al. | 429/42 |
| 2004/0191602 | A1 | 9/2004 | Ishikawa et al. | |
| 2004/0197638 | A1 * | 10/2004 | McElrath et al. | 429/44 |
| 2004/0234841 | A1 | 11/2004 | Yoshitake et al. | |
| 2005/0053826 | A1 | 3/2005 | Wang et al. | |
| 2006/0115712 | A1 | 6/2006 | Kim et al. | |
| 2006/0172179 | A1 | 8/2006 | Gu et al. | |

FOREIGN PATENT DOCUMENTS

| | | | | |
|---|---|---|---|---|
| CN | 1498435 | | 5/2004 | |
| CN | 1523698 | | 8/2004 | |
| CN | 1630676 | A | 6/2005 | |
| EP | 1 336 998 | A1 | 8/2003 | |
| EP | 1383 186 | A1 | 1/2004 | |
| JP | 62-232860 | | 10/1987 | |
| JP | 08-017440 | | 1/1996 | |
| JP | 2000-12041 | | 1/2000 | |
| JP | 2000-260435 | | 9/2000 | |
| JP | 2001-216973 | | 8/2001 | |
| JP | 2001-283738 | | 10/2001 | |
| JP | 2002-110181 | | 4/2002 | |
| JP | 2002-298861 | * | 10/2002 | H01M 4/96 |
| JP | 2002-534773 | | 10/2002 | |
| JP | 2003-115302 | | 4/2003 | |
| JP | 2003-200052 | | 7/2003 | |
| JP | 2004-036038 | | 2/2004 | |
| JP | 2004-059428 | | 2/2004 | |
| JP | 2004-103592 | | 4/2004 | |
| JP | 2004-152489 | | 5/2004 | |
| JP | 2004-288489 | | 10/2004 | |
| JP | 2004-311276 | | 11/2004 | |
| JP | 2004-362875 | | 12/2004 | |
| JP | 2005-100748 | | 4/2005 | |
| KR | 1993-0020757 | | 10/1993 | |
| KR | 95-28209 | | 10/1995 | |
| KR | 2003-0038771 | | 5/2003 | |
| KR | 2003-0095694 | | 12/2003 | |
| KR | 1020040011181 | A1 * | 2/2004 | B28B 1/00 |
| KR | 10-2004-0051287 | | 6/2004 | |
| WO | WO 99/33132 | | 7/1999 | |
| WO | WO 01/80334 | A2 | 10/2001 | |
| WO | WO 02/17427 | A1 | 2/2002 | |
| WO | WO 02/27828 | A1 | 4/2002 | |
| WO | WO 02/27830 | A1 | 4/2002 | |
| WO | WO 02/41432 | A1 | 5/2002 | |
| WO | WO 02/073722 | A1 | 9/2002 | |
| WO | WO 02/075831 | A1 | 9/2002 | |
| WO | WO 03/083128 | A2 | 10/2003 | |

OTHER PUBLICATIONS

U.S. Office action dated Oct. 20, 2008, for related U.S. Appl. No. 11/221,999, indicating relevance of listed U.S. Pat. No. 5,910,378 in this IDS.

Patent Abstracts of Japan, Publication No. 2004-036038, dated Feb. 5, 2004, in the name of Hiroshi Hosokawa et al.

U.S. Office action dated May 14, 2009, for related U.S. Appl. No. 11/289,134, noting listed U.S. reference in this IDS.

Japanese Office action dated Oct. 27, 2009, for corresponding Japanese application 2005-183925, noting listed reference in this IDS, as well as WO 02/073722 previously filed in an IDS dated Nov. 11, 2008.

Japanese Office action dated Oct. 27, 2009, for Japanese application 2005-340578, noting listed references in this IDS.

U.S. Office action dated Sep. 29, 2009, for related U.S. Appl. No. 11/494,851, noting U.S. Publications listed in this IDS.

Japanese Office action dated Apr. 20, 2010, for Japanese Patent application 2006-208240, noting listed references in this IDS.

U.S. Office action dated Mar. 19, 2010, for related U.S. Appl. No. 11/494,851.

U.S. Office action dated Mar. 24, 2010, for related U.S. Appl. No. 11/289,134.

U.S. Office action dated Dec. 8, 2010 in related U.S. Appl. No. 11/221,999 (9 sheets).

U.S. Office action dated Sep. 1, 2010, for related U.S. Appl. No. 11/289,134.

Patent Abstracts of Japan and English machine translation for JP 2001-216973.

Japanese Patent Office Action dated Nov. 2, 2010, issued in Japanese application No. JP 2005-261157, listing the Foreign Patent Documents references cited in this IDS.

U.S. Office action dated Jun. 21, 2010, for related U.S. Appl. No. 11/221,999.

U.S. Office action dated Aug. 18, 2010, for related U.S. Appl. No. 11/494,851, noting International publication WO 2005/044723, published subsequent to U.S. Appl. No. 11/126,483 filing date.

U.S. Office action dated Feb. 2, 2011, for cross reference U.S. Appl. No. 11/494,851, 7 pages.

U.S. Office action dated Feb. 16, 2011, for cross reference U.S. Appl. No. 11/289,134, 10 pages.

Japanese Office action dated Jun. 7, 2011, for corresponding Japanese Patent application 2005-340578, 3 pages.

U.S. Office action dated Aug. 3, 2011, for cross-reference U.S. Appl. No. 11/288,887, 25 pages.

U.S. Notice of Allowance dated Jul. 8, 2011, for cross-reference U.S. Appl. No. 11/494,851, 8 pages.

U.S. Notice of Allowance dated May 2, 2011, for cross-reference U.S. Appl. No. 11/289,134, 8 pages.

U.S. Notice of Allowance dated May 11, 2011, for cross-reference U.S. Appl. No. 11/221,999, 9 pages.

KIPO Notice of Allowance dated Jan. 20, 2012, for Korean priority Patent application 10-2004-0047053, 5 pages.

U.S. Office action dated Mar. 14, 2012, for cross reference U.S. Appl. No. 11/288,887, (21 pages).

U.S. Advisory action dated Jun. 25, 2012, for cross reference U.S. Appl. No. 11/288,887, (4 pages).

Che, Guangli et al.; *Metal-Nanocluster-Filled Carbon Nanotubes: Catalytic Properties and Possible Applications in Electrochemical Energy Storage and Production*; Langmuir 1999, vol. 15, pp. 750-758; XP-000964916.

B. Rajesh et al., *Pt-$WO_3$ Supported on Carbon Nanotubes as Possible Anodes for Direct Methanol Fuel Cells*, Fuel, vol. 81, (2002); pp. 2177-2190.

Tang, Hao et al., *Deposition and electrocatalytic properties of platinum on well-aligned carbon nanotube (CNT) arrays for methanol oxidation*; Materials Chemistry and Physics 92 (2005) pp. 548-553.

European Search Report, dated Mar. 6, 2006, for EP Application No. 05111129.2 in the name of Samsung SDI Co., Ltd.

European Search Report, dated Apr. 24, 2006, for Application No. 05111288.6, in the name of Samsung SDI Co., Ltd.

Extended European Search Report for corresponding application EP 06118097.2-2119; dated Oct. 6, 2006.

* cited by examiner

ELECTRODE FOR FUEL CELL, MEMBRANE-ELECTRODE ASSEMBLY FOR FUEL CELL COMPRISING THE SAME, FUEL CELL SYSTEM COMPRISING THE SAME, AND METHOD FOR PREPARING THE ELECTRODE

CROSS REFERENCES TO RELATED APPLICATION

This application claims priority to and the benefit of Korean Patent Application Nos. 10-2004-0047053 and 10-2004-0050773 filed in the Korean Industrial Property Office on Jun. 23, 2004 and Jun. 30, 2004 respectively, the entire contents of which are incorporated hereinto by reference.

FIELD OF THE INVENTION

The present invention relates to an electrode for a fuel cell, a membrane-electrode assembly for a fuel cell comprising the same, a fuel cell system comprising the same, and a method for fabricating the electrode for a fuel cell. More particularly, it relates to an electrode for a fuel cell that includes a catalyst layer having a high surface area, a membrane-electrode assembly for a fuel cell comprising the electrode, a fuel cell system comprising the electrode, and a method for fabricating the electrode for a fuel cell.

BACKGROUND OF THE INVENTION

A fuel cell is a device for generating electricity directly from the electrochemical reaction of oxygen with either hydrogen or the hydrogen found in hydrocarbon materials such as methanol, ethanol, or natural gas.

A fuel cell can be classified into one of the following types: a phosphoric acid type, a molten carbonate type, a solid oxide type, a polymer electrolyte type, or an alkaline type depending upon the kind of electrolyte used. Although each fuel cell basically operates in accordance with the same basic principles, the type of fuel cell may determine the kind of fuel, the operating temperature, the catalyst, and the electrolyte that are used.

Recently, polymer electrolyte membrane fuel cells (PEMFC) have been developed that have superior power characteristics, lower operating temperatures, and faster start and response characteristics compared to conventional fuel cells. They have advantages since they can be applied to a wide range of fields, such as transportable electric sources for automobiles, distributed power sources, for example for houses and public buildings, and small electric sources for electronic devices.

The PEMFC is essentially composed of an electricity generator, a reformer, a fuel tank, and a fuel pump. The fuel pump provides fuel stored in the fuel tank to the reformer. The reformer reforms the fuel to generate hydrogen gas and supplies the hydrogen gas to the electricity generator where it is electrochemically reacted with oxygen to generate electrical energy.

Another type of fuel cell is a direct oxidation fuel cell (DOFC) such as a direct methanol fuel cell (DMFC) in which liquid methanol fuel is directly introduced to the electricity generator. The DMFC can omit the reformer, which is essential for a polymer electrolyte fuel cell.

According to the fuel cell system described above, the electricity generator in a fuel cell system generates electricity and has a layered structure (referred to as stack) consisting of from several to tens of unit cells. Each unit cell is composed of a membrane-electrode assembly (MEA) and two separators (or bipolar plates). The MEA has a structure with a polymer electrolyte membrane interposed between the anode (referred to as fuel electrode or oxidation electrode) and the cathode (referred to as air electrode or reduction electrode).

The separators not only work as passageways for supplying the fuel required for the reaction to the anode and for supplying oxygen to the cathode, but also as conductors serially connecting the anode and the cathode in the MEA. An electrochemical oxidation reaction of the fuel occurs at the anode, and an electrochemical reduction reaction of oxygen occurs at the cathode, thereby producing electricity, heat, and water, due to the migration of electrons generated during this process.

Generally, the anode and cathode of a fuel cell contain a platinum (Pt) catalyst. However, since platinum is an expensive noble metal, it is expensive to use in large quantities. Therefore, platinum supported by carbon has been used to reduce the amount of platinum used.

However, carbon-supported platinum catalyst makes the catalyst layer thick and has a limited storage capacity. Moreover, poor contact between the catalyst layer and the electrolyte membrane degrades the performance of the fuel cell.

Also, using a carbon-supported platinum catalyst may cause problems in that part of the carbon-supported platinum catalyst is buried in a binder resin during the electrode fabricating process, and such buried catalyst is incapable of participating in the desired catalytic reactions.

Therefore, there are benefits in developing an electrode for a fuel cell that uses a reduced amount of catalyst in the electrode while still showing excellent cell performance.

SUMMARY OF THE INVENTION

According to one embodiment of the present invention, an electrode is provided for a fuel cell that includes a catalyst having a high specific surface area.

In another embodiment of the present invention, an electrode is provided for a fuel cell that has excellent reactivity while including a small quantity of a metal catalyst.

In yet another embodiment of the present invention, a membrane-electrode assembly is provided for a fuel cell that includes the electrode described above.

In still another embodiment of the present invention, a fuel cell is provided including the electrode described above.

In another embodiment of the present invention, a method is provided for fabricating the electrode for a fuel cell.

According to one embodiment of the present invention, an electrode is provided for a fuel cell which includes an electrode substrate and a catalyst layer comprising a filler layer formed on the surface of the electrode substrate and a catalyst coated on the filler layer.

A membrane-electrode assembly according to an embodiment of the present invention comprises a polymer electrolyte membrane with a pair of electrodes as described above, the electrodes being positioned on both sides of the polymer electrolyte membrane. A fuel cell system according to an embodiment of the present invention comprises a fuel supply unit, an oxidant supply unit, and an electricity generating unit receiving fuel from the fuel supply unit and oxidant from the oxidant supply unit to generate electricity, the electricity generating unit including at least one membrane-electrode assembly and a separator, the membrane-electrode assembly comprising a polymer electrolyte membrane, and a pair of electrodes positioned on the sides of the polymer electrolyte membrane, wherein at least one of the electrodes comprises an electrode substrate and a catalyst layer comprising a filler layer adjacent the electrode substrate and a catalyst coating the filler layer.

A method for fabricating an electrode for a fuel cell according to an embodiment of the present invention includes the steps of: a) forming a filler layer by wet coating the surface of an electrode substrate with nanocarbon; and b) forming a catalyst layer by coating the filler layer with a catalyst.

A method for fabricating an electrode for a fuel cell according to an embodiment of the present invention includes the steps of: a) forming a polymer network on the surface of filler particles by mixing filler particles with a binder resin, coating one side of an electrode substrate with the mixture, drying the electrode substrate coated with the mixture, and performing a thermal treatment; and b) fabricating a catalyst electrode with a catalyst layer by filling metal catalyst particles in the spaces of the polymer network.

BRIEF DESCRIPTION OF THE DRAWINGS

The accompanying drawings, which are incorporated in and constitute a part of the specification, illustrate embodiments of the invention, and together with the description, serve to explain the principles of the invention, wherein.

DETAILED DESCRIPTION

In the following detailed description, certain embodiments of the invention have been shown and described. As will be realized, the invention is capable of modification in various respects, all without departing from the invention. Accordingly, the drawings and description are to be regarded as illustrative in nature, and not restrictive.

In most cases, expensive noble metals are used as metal catalysts for a membrane-electrode assembly of a fuel cell. Among them, platinum is used most widely. However, due to its expense, it is desirable to reduce the amount of metal catalyst while maintaining the performance of a fuel cell.

One method for reducing the amount of metal catalyst used is to deposit the catalyst on a substrate to thereby form a catalyst layer. However, the surface area of the catalyst layer depends on the surface area of the substrate on which the catalyst is deposited. If the catalyst layer has a small surface area, the output characteristic of a fuel cell is degraded.

An electrode of a first embodiment of the present invention comprises an electrode substrate with a catalyst layer having a filler layer formed on the surface of the electrode substrate and a catalyst coating the filler layer.

In accordance with an embodiment of the present invention, the surface area for the electrode for a fuel cell is maximized by forming a nanocarbon layer on an electrode substrate and then depositing a catalyst thereon. The result is a thin catalyst layer with a high specific surface area.

Figure 1A:
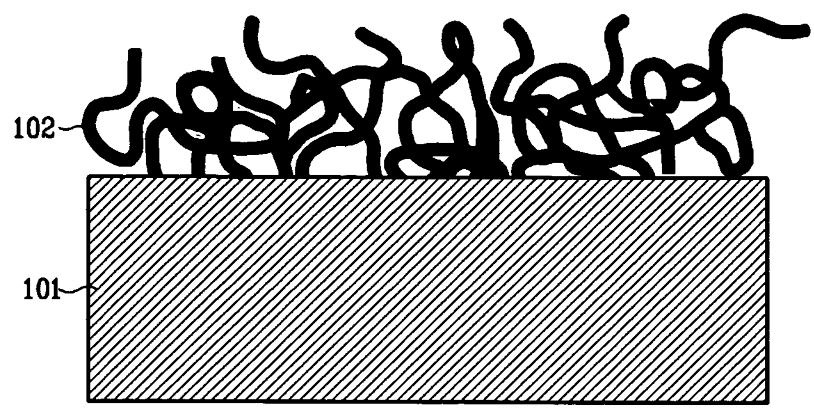
FIG. 1A is a schematic cross-sectional view showing an electrode substrate before a catalyst is deposited.
Figure 1B:
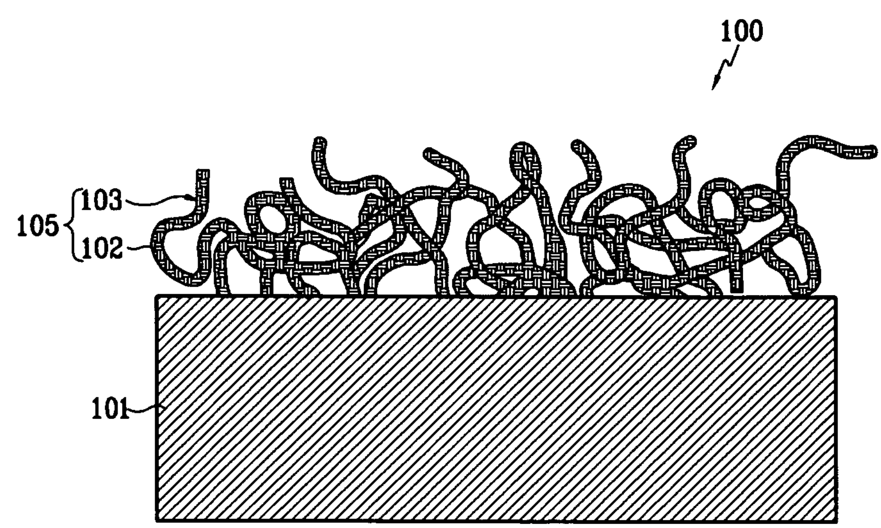
FIG. 1B is a schematic cross-sectional view showing an electrode for a fuel cell with a catalyst deposited thereon in accordance with a first embodiment of the present invention.

FIG. 1A is a schematic cross-sectional view showing an electrode substrate with maximized surface area. FIG. 1B is a schematic cross-sectional view showing an electrode for a fuel cell with maximized surface area with a catalyst deposited on the surface in accordance with a first embodiment of the present invention.

Referring to FIGS. 1A and 1B, the electrode 100 for a fuel cell comprises an electrode substrate 101 with a nanocarbon layer 102 formed on the surface of the electrode substrate 101 and a catalyst 103 coating the nanocarbon layer 102 wherein the nanocarbon layer 102 and catalyst 103 together form a catalyst layer 105.

The electrode substrate 101 is the support for the electrode 100 and, at the same time, provides a path for transferring fuel and oxygen gas to the catalyst 105. Examples of materials used for the electrode substrate 101 include carbon paper or carbon cloth. An electrode substrate 101 formed of carbon paper or carbon cloth is generally called a gas diffusion layer.

The electrode substrate 101, including a gas diffusion layer of carbon paper or carbon cloth, can also include a microporous layer as well as the gas diffusion layer. The microporous layer spreads the fuel and oxygen gas transferred through the gas diffusion layer and helps the gas contact the catalyst. Suitable material for the microporous layer is carbon with micropores and exemplary carbon materials include graphite, fullerene (C60), activated carbon, and carbon black.

In one embodiment of the invention, the gas diffusion layer of the electrode substrate has a thickness between 10 μm and 1,000 μm, and the microporous layer has a thickness between 1 μm and 100 μm. When the gas diffusion layer has a thickness less than 10 μm, it cannot serve as a supporter. When it has a thickness more than 1,000 μm, the fuel and oxygen gas cannot be supplied smoothly. Also, when the microporous layer has a thickness less than 1 μm, the fuel and gas cannot be sufficiently diffused and cannot contact the catalyst layer evenly. When it has a thickness more than 100 μm, the fuel and oxygen gas cannot be supplied smoothly.

In one embodiment of the invention, the nanocarbon layer formed on the electrode substrate has a thickness between 0.05 μm to 10 μm. When it has a thickness less than 0.05 μm, the effect of the surface area increase is insignificant. When it has a thickness more than 10 μm, no further surface area increase effect can be brought about and the electrode becomes thick, which is not desirable.

Suitable nanocarbon material for the nanocarbon layer include those selected from the group consisting of carbon nanotubes, carbon nanofibers, carbon nanowires, carbon nanohorns, and carbon nanorings.

In one embodiment, the preferred nanocarbon has a diameter of 1 to 500 nm and a length of 50 to 5,000 nm. In general, a smaller diameter nanocarbon provides better results. However, when the diameter is smaller than 1 nm, fabrication is difficult. When the diameter is bigger than 500 nm, the surface area increase effect is small. When the nanocarbon has a length shorter than 50 nm, the porosity is decreased due to the dense arrangement of nanocarbon, which makes it hard to supply fuel. When the nanocarbon has a length longer than 500 nm, the nanocarbon is difficult to disperse when the slurry is prepared.

In one embodiment, the amount of catalyst provided in the catalyst layer is from 0.001 to 0.5 mg/cm$^2$ per unit area and, preferably, is from 0.01 to 0.05 mg/cm$^2$. When the amount of catalyst in the catalyst layer is less than 0.001 mg/cm$^2$, the fuel cell does not have a sufficient efficiency. When the catalyst content exceeds 0.5 mg/cm$^2$, the benefits of the invention are not achieved.

In one embodiment, the preferred specific surface area per unit weight of the catalyst in the catalyst layer is from 10 to 500 m$^2$/g. Since an oxidation/reduction reaction of the fuel cell occurs on the surface of the catalyst, the fuel cell has excellent efficiency when it has a high specific surface area per unit weight. in contrast, when the specific surface area per unit weight is smaller than 10 m$^2$/g, the fuel cell has poor efficiency. However, when the specific surface area per unit weight is more than 500 m$^2$/g, there are problems fabricating the fuel cell.

Suitable catalysts for the catalyst layer include those selected from the group consisting of platinum, ruthenium, osmium, platinum-ruthenium alloys, platinum-osmium alloys, platinum-palladium alloys, and platinum-M alloys, where M is a transition metal selected from the group consisting of Ga, Ti, V, Cr, Mn, Fe, Co, Ni, Cu, Zn and combinations thereof. Preferred catalysts include those selected from the group consisting of platinum, ruthenium, osmium, platinum-ruthenium alloys, platinum-osmium alloys, platinum-palladium alloys, platinum-cobalt alloys, and platinum-nickel alloys.

Figure 2:
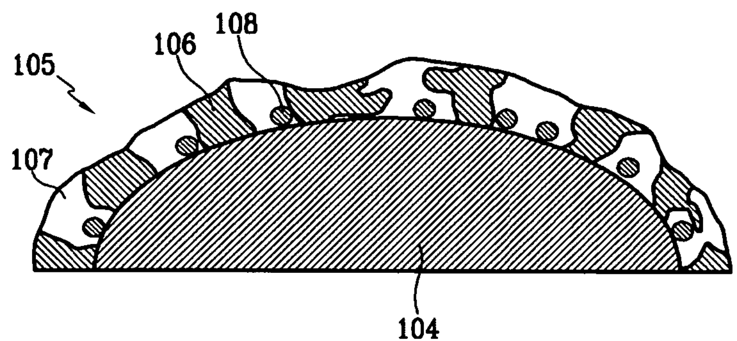
FIG. 2 is a schematic cross-sectional view depicting a catalyst layer of an electrode for a fuel cell in accordance with a second embodiment of the present invention.

In accordance with a second embodiment of the present invention as shown in FIG. 2, an electrode for a fuel cell includes a catalyst layer 205 made up of a plurality of filler particles 104 with a polymer network 106 formed on the surface of each filler particle 104 and defining spaces 107 in the polymer network 106. Catalyst particles 108 are located in certain of the spaces 107 of the polymer network.

Because the catalyst particles 108 are located in the spaces 107 of the polymer network 106, excellent reactivity can be achieved with a small quantity of catalyst.

For the second embodiment of the present invention, suitable catalysts for the catalyst particles are those described in the first embodiment.

For the second embodiment of the present invention, the catalyst particles may have an average diameter from 1 to 1,000 nm, and preferably, the catalyst particles have an average particle diameter of 1 to 100 nm. When the average particle diameter is smaller than 1 nm, the preparation of the catalyst particles is difficult. When the average particle diameter is larger than 1,000 nm, the performance of the fuel cell can be degraded.

For the second embodiment, preferred quantities of the catalyst particles are from 0.0001 to 0.4 mg/cm$^2$ per unit area in the catalyst layer, and more preferably from 0.01 to 0.3 mg/cm$^2$. When the quantity of the metal catalyst particles is less than 0.0001 mg/cm$^2$, the fuel cell has a degraded reactivity. When the quantity of the metal catalyst particles is more than 0.4 mg/cm$^2$, little benefit is achieved.

Suitable materials for the filler particles included in the catalyst layer of the electrode for a fuel cell in accordance with the second embodiment of the present invention include carbon particles, inorganic particles, and combinations thereof. Exemplary carbon particles are selected from the group consisting of graphite, nanocarbon, and combinations thereof. Suitable inorganic particles are selected from the group consisting of alumina, silica, and combinations thereof.

The polymer network which is formed on the surface of the filler particles may be formed from a binder resin selected from the group consisting of fluorine-based binder resins, benzimidazole-based binder resins, ketone-based binder resins, ester-based binder resins, amide-based binder resins, and imide-based binder resins. In certain embodiments of the invention, the binder resin may include at least one proton-conducting polymer selected from poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), and poly(2,5-benzimidazole). However, such binder resins are merely exemplary and are not limiting.

Figure 3:
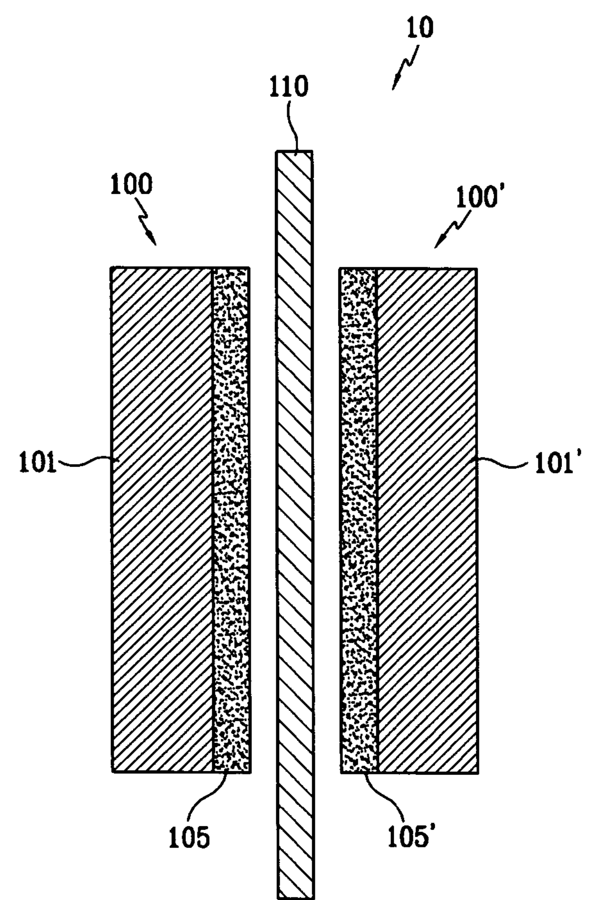
FIG. 3 is a schematic cross-sectional view illustrating a membrane-electrode assembly including an electrode for a fuel cell in accordance with an embodiment of the present invention.

Referring to FIG. 3, a schematic cross-sectional diagram illustrating a membrane-electrode assembly 10, the anode electrode 100 and cathode electrode 100' for a fuel cell in accordance with the first and second embodiments of the present invention are positioned on both sides of a polymer electrolyte membrane 110 to thereby form a membrane-electrode assembly. The electrodes 100 and 100' include electrode substrates 101 and 101', respectively, with respective catalyst layers 105 and 105'.

At the anode, an oxidation reaction of fuel occurs to generate protons, $H^+$, and electrons, $e^-$. The polymer electrolyte membrane 110 transmits the generated protons to the cathode. The transmitted protons on the cathode are electrochemically reacted with the oxygen supplied on the cathode to generate water.

The polymer electrolyte membrane 110 includes at least one proton-conducting polymer. Suitable proton-conducting polymers are selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, and polyphenylquinoxaline-based polymers. Preferred proton-conducting polymers include those selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), and poly(2,5-benzimidazole). However, according to the present invention, the proton-conducting polymer included in the polymer electrolyte membrane for a fuel cell is not limited to these polymers.

The membrane-electrode assembly can be used for various types of fuel including Polymer Electrolyte Membrane Fuel Cells (PEMFC) and Direct Oxidation Fuel Cells (DOFC). Since such membrane-electrode assemblies have high specific surface area, they provide excellent performance.

Figure 4:
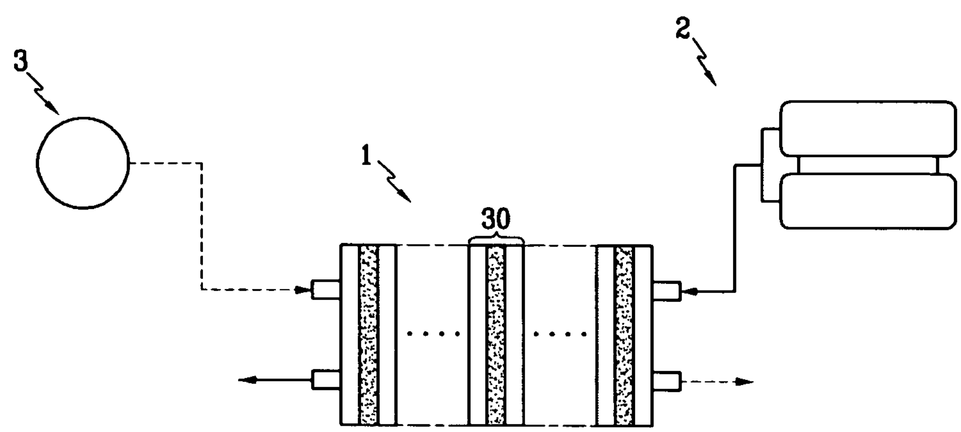
FIG. 4 is a schematic diagram illustrating a fuel cell system in accordance with an embodiment of the present invention.
Figure 5:
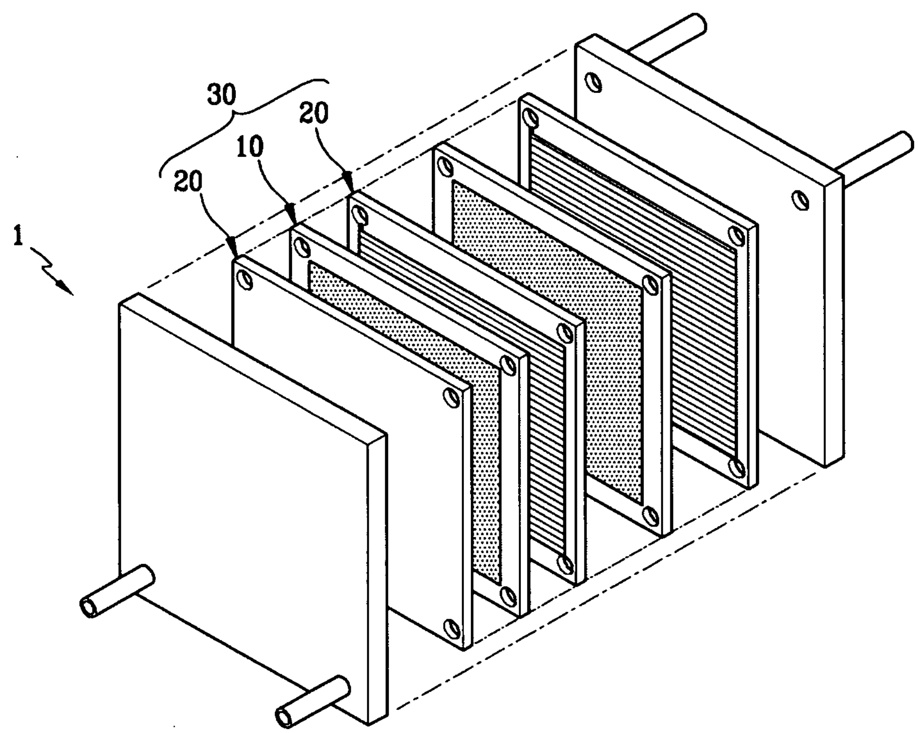
FIG. 5 is an exploded perspective view schematically showing an electricity generating unit including the electrodes for a fuel cell according to an embodiment of the present invention.

FIG. 4 is a schematic diagram illustrating a fuel cell system in accordance with an embodiment of the present invention, and FIG. 5 is an exploded perspective view schematically showing a electricity generating unit including electrodes for a fuel cell according to an embodiment of the present invention.

Referring to FIGS. 4 and 5, a fuel cell system of the present invention includes a fuel supply unit 2 which supplies fuel including hydrogen, an oxidant supply unit 3 which supplies oxidant such as air containing oxygen to the electricity generating unit 1 which generates electricity by electrochemical reactions between the fuel and the oxidizing agent.

The electricity generating unit 1 of the present invention includes at least one unit cell 30 which includes a membrane-electrode assembly 10 including a polymer electrolyte membrane, and an anode and a cathode positioned on the sides of the polymer electrolyte membrane, and a separator 20. And, at least one of the cathode and the anode comprises an electrode substrate and a catalyst layer comprising a filler layer adjacent the electrode substrate and a catalyst coating the filler layer.

A method for fabricating the electrode for a fuel cell according to the first embodiment of the present invention comprises the steps of: a) forming a nanocarbon layer by wet coating the surface of an electrode substrate with nanocarbon; and b) forming a catalyst layer by coating the nanocarbon layer with a catalyst.

For the electrode substrate, a gas diffusion layer (GDL) selected from the group consisting of carbon paper and carbon cloth can be used. If necessary, the electrode substrate may further include a microporous layer formed on the surface of the gas diffusion layer.

According to one embodiment, the gas diffusion layer has a thickness of 10 μm to 1,000 μm, and the microporous layer has a thickness from 1 μm to 100 μm.

The microporous layer may be a carbon layer with micropores, and preferable materials for the microporous layer include those selected from graphite, fullerene (C60), activated carbon, carbon black, and combinations thereof.

The surface of the electrode substrate is coated with the nanocarbon layer in a wet coating method, and a cross section of the electrode substrate coated with the nanocarbon layer is shown in FIG. 1A. Examples of wet coating methods are slurry methods in which nanocarbon is mixed with an organic solvent and a binder, and a substrate is coated with the nanocarbon mixture, screen printing methods, doctor blade methods, and spray coating methods. However, the method for forming the nanocarbon layer in the present invention is not limited to the above-mentioned methods.

Since the wet coating method is well known technology, a detailed description of it will not be provided herein. If a binder is used, suitable binders are proton conductive polymers. Examples of proton conductive polymers are set forth above in describing the polymer electrolyte membrane. However, other conventional binders that are not proton conductive polymer can be used, such as polytetrafluoroethylene, polyvinylidene fluoride, polyvinyl alcohol, polyvinyl chloride, polystyrene-butadiene copolymers, and cellulose. However, the binder used in the wet coating of the present invention is not limited to the above-mentioned examples.

The solvent used in the wet coating method does not have any specific restriction. Suitable solvents include water, alcohols such as methanol, ethanol, or isopropyl alcohol, aromatic alcohols such as terpineol, ethers, ketones, benzenes, amides, and esters.

In one embodiment, it is preferred that the nanocarbon layer is formed to have a thickness from 0.05 μm to 10 μm.

Suitable nanocarbon included in the nanocarbon layer are selected from the group consisting of carbon nanotubes (CNT), carbon nanofibers, carbon nanowires, carbon nanohorns, and carbon nanorings.

In one embodiment, the nanocarbon has a diameter from 1 to 500 nm and a length from 50 to 5,000 nm.

The catalyst layer may be formed by depositing a catalyst on the nanocarbon layer of the electrode substrate, which is fabricated as above. In one embodiment, the preferred catalyst content is from 0.01 to 0.5 $mg/cm^2$ per unit area and, more preferably, 0.01 to 0.05 $mg/cm^2$ per unit area. In this embodiment, it is also preferable that the specific surface area per unit weight of the catalyst included in the catalyst layer be from 10 to 500 $m^2/g$.

The catalyst layer can be formed by using a conventional deposition method. Suitable deposition methods are selected from the group consisting of sputtering methods, Physical Vapor Deposition (PVD) methods, Thermal Chemical Vapor Deposition (CVD) methods, Plasma Enhanced CVD (PECVD) methods, thermal evaporation methods, electrochemical deposition methods, and electron beam evaporation methods. However, the deposition method used in the present invention is not limited to the above-mentioned deposition methods and, if necessary, it is possible to mix and use more than two methods.

Suitable catalysts are selected from the group consisting of platinum, ruthenium, osmium, platinum-ruthenium alloys, platinum-osmium alloys, platinum-palladium alloys, and platinum-M alloys, where M is a transition metal selected from the group consisting of Ga, Ti, V, Cr, Mn, Fe, Co, Ni, Cu, Zn and combinations thereof. Preferred catalysts are selected from the group consisting of platinum, ruthenium, osmium, platinum-ruthenium alloys, platinum-osmium alloys, platinum-palladium alloys, platinum-cobalt alloys, and platinum-nickel alloys.

A method for fabricating an electrode for a fuel cell in accordance with the second embodiment of the present invention comprises the steps of: a) forming a polymer network on the surface of filler particles by mixing filler particles with a binder resin, coating one side of an electrode substrate with the mixture, drying the electrode substrate coated with the mixture and performing a thermal treatment; and b) fabricating a catalyst electrode with a catalyst layer by filling metal catalyst particles in the spaces of the polymer network.

The polymer network can be fabricated by dissolving the filler particles and the binder resin in a solvent to thereby prepare a mixture, coating one side of the electrode substrate with the mixture, drying the electrode substrate coated with the mixture, and performing a thermal treatment. The polymer network that is fabricated through the above process has fine spaces formed therein.

Suitable filler particles used in the formation of the catalyst layer include carbon particles, inorganic particles, and combinations thereof. Suitable carbon particles are selected from the group consisting of graphite, carbon, and nanocarbon, and combinations thereof. Suitable inorganic particles are selected from the group consisting of alumina, silica, and combinations thereof.

The polymer network which is formed on the surface of the filler particles may be prepared using at least one binder resin selected from the group consisting of fluorine-based binder resins, benzimidazole-based binder resins, ketone-based binder resins, ester-based binder resins, amide-based binder resins, and imide-based binder resins. The binder resin may also be a proton-conducting polymer selected from poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), and poly(2,5-benzimidazole). However, according to the present invention, the binder resin is not limited to these.

Since examples of the electrode substrate are the same as those in the first embodiment, a detailed description of them will not be provided herein.

The polymer network of the electrode for a fuel cell in accordance with the second embodiment of the present invention has spaces, and the catalyst layer is formed by filling catalyst particles in the spaces. The catalyst method can be formed by directly sprinkling catalyst particles, coating the polymer network with catalyst particles by a deposition method, or using a method of dispersing a catalyst dispersing solution comprising a catalyst in an organic solvent, impregnating the polymer network with the catalyst dispersing solution, and evaporating the solvent. Suitable organic solvents used for the catalyst dispersing solution are not limited to specific kinds of solvents and any solvent can be used as long as it can disperse the metal catalyst.

Examples of the catalyst used to form the catalyst layer are the same as the examples in the first embodiment, and a detailed description of them will be omitted.

In one embodiment, the preferred catalyst is a metal catalyst with particles having an average particle diameter from 1 to 1,000 nm and, more preferably, from 1 to 100 nm. When the average particle diameter of the catalyst particles is smaller than 1 nm, the catalyst is difficult to prepare. When the average particle diameter is bigger than 1,000 nm, the catalytic performance can be degraded.

In another embodiment, the amount of catalyst particles in the spaces of the polymer network is from 0.0001 to 0.4 mg/cm$^2$ per unit area, and preferably from 0.1 to 0.3 mg/cm$^2$. When the quantity of the catalyst particles is less than 0.0001 mg/cm$^2$ per unit area, the fuel cell has degraded reactivity. When the quantity of the metal catalyst particle is more than 0.4 mg/cm$^2$, the catalytic performance is degraded.

A membrane-electrode assembly can be fabricated by positioning and joining the electrodes for a fuel cell to both sides of the polymer electrolyte membrane.

The polymer electrolyte membrane for the membrane-electrode assembly may include any proton-conducting polymer. Suitable proton-conducting polymers are selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, and polyphenylquinoxaline-based polymers. In one embodiment, the proton-conducting polymer may include, but is not limited to, a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), and poly(2,5-benzimidazole). However, according to the present invention, the proton-conducting polymer is not limited to these polymers.

The following examples illustrate the present invention in further detail. However, it is understood that the present invention is not limited by these examples.

Example 1

A carbon nanotube slurry was prepared by mixing carbon nanotube (CNT) having an average diameter of 30 nm and an average length of 1,000 nm with a poly(perfluorosulfonic acid) solution (Nafion™ solution produced by the DuPont Company.) Then, an electrode substrate with a 20 μm-thick activated carbon layer on the surface of a 280 μm-thick carbon cloth was prepared. The surface of the activated carbon layer of the electrode substrate was coated with the carbon nanotube slurry and then dried to thereby form a nanocarbon layer. Then, electrodes for a fuel cell in accordance with the first embodiment of the present invention were fabricated by sputtering 0.05 mg/cm$^2$ platinum per unit area on the surface of the nanocarbon layer of the electrode substrates. Subsequently, a membrane-electrode assembly was fabricated by positioning and joining the electrodes for a fuel cell on the sides of a Nafion™ poly(perfluorosulfonic acid) membrane. A fuel cell was fabricated by positioning separators on both sides of the membrane-electrode assembly.

Comparative Example 1

A fuel cell was fabricated by the same method as in Example 1, except that the electrodes for the fuel cell were fabricated by sputtering 0.05 mg/cm$^2$ platinum per unit area on the surface of 280 μm-thick carbon cloth.

Comparative Example 2

A fuel cell was fabricated by the same method as in Example 1, except that the electrodes for the fuel cell were fabricated by sputtering 0.05 mg/cm$^2$ platinum per unit area on the surface of an activated carbon layer of an electrode substrate, which includes a 20 μm-thick activated carbon layer formed on 280 μm-thick carbon cloth.

Comparative Example 3

A slurry was prepared by mixing 3 g platinum catalyst which was supported by carbon (of which platinum content is 20 wt %) and 1 g of Nafion™ poly(perfluorosulfonic acid) solution A fuel cell was fabricated by the same method as Example 1, except that the electrodes for the fuel cell were fabricated by coating the surface of an activated carbon layer of an electrode substrate, which includes a 20 μm-thick activated carbon layer formed on 280 μm-thick carbon cloth, with the slurry and drying the electrode substrates coated with the slurry. Herein, the content of the platinum catalyst contained in the catalyst layer was 0.4 mg/cm$^2$ per unit area. With respect to the fuel cells fabricated in accordance with Example 1 and Comparative Examples 1 to 3, voltage and current per weight of catalyst (CPW) were measured and the results were as presented in FIG. 6.

Figure 6:
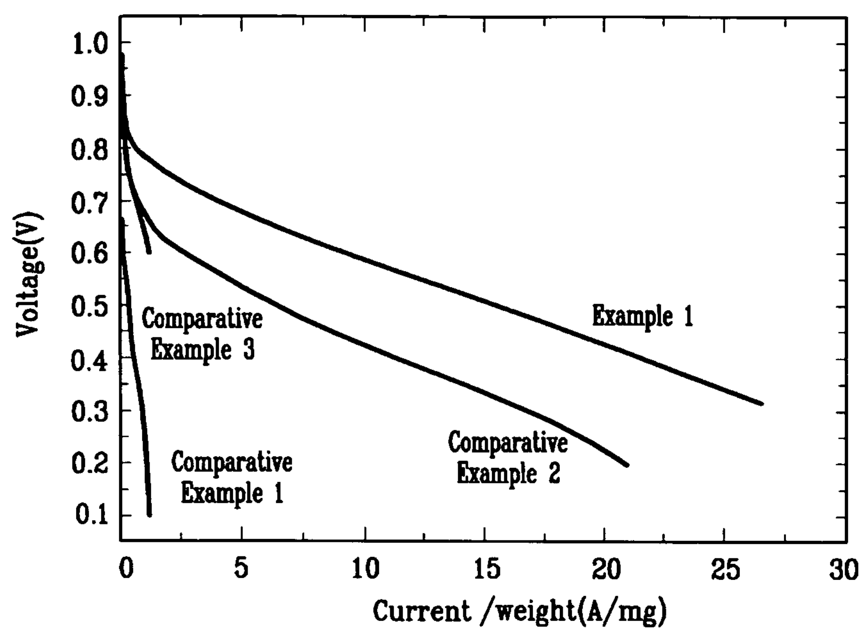
FIG. 6 is a graph showing voltage and a current per weight of catalyst (CPW) of fuel cells fabricated in accordance with Example 1 and Comparative Examples 1 to 3.

As shown in FIG. 6, the fuel cells fabricated in accordance with Example 1 of the present invention provided excellent performance with an eighth of the catalyst contained in the fuel cell fabricated in accordance with Comparative Example 3, and showed superior performance to the fuel cells of Comparative Examples 1 and 2, which do not contain the nanocarbon layer and have the catalyst deposited thereon. The electrode for a fuel cell which is suggested in the first embodiment of the present invention has a high specific surface area for the catalyst and thus has an advantage that the performance of the fuel cell can be improved with a small quantity of catalyst.

Example 2

A slurry for forming a catalyst layer was prepared by mixing 30 parts by weight carbon having an average particle diameter of 100 nm and 10 parts by weight polytetrafluoroethylene in 100 parts by weight isopropyl alcohol. A piece of carbon paper was coated with the slurry, and then the carbon paper coated with the slurry was dried and thermally treated to thereby form a polymer network on the surface of carbon particles.

Then, a platinum dispersing solution was prepared by dispersing 1 part by weight platinum in 100 parts by weight butyl alcohol. The fabricated catalyst electrode was impregnated with the platinum dispersing solution and dried to thereby fill the spaces of the polymer network with platinum particles and fabricate a catalyst electrode in accordance with the second embodiment of the present invention. The content of the catalyst contained in the catalyst layer of the catalyst electrode was 0.05 $mg/cm^2$ per unit area.

A membrane-electrode assembly was fabricated by joining two catalyst electrodes which were fabricated as set forth above and a poly(perfluorosulfonic acid) electrolyte membrane. Herein, the catalyst layers of the catalyst electrodes were positioned to contact both sides of the electrolyte membrane. On both sides of the above fabricated membrane-electrode assembly, separators each having a flow channel were attached to thereby fabricate a fuel cell.

Comparative Example 4

A slurry for forming a catalyst layer was prepared by mixing 40 parts by weight carbon-supported platinum catalyst (Pt/C), which was produced by the Johnson Matthey Company and which included 10 wt % platinum, and 10 parts by weight polytetrafluoroethylene in 100 parts by weight isopropyl alcohol. A piece of carbon paper was coated with the slurry, and then the carbon paper coated with the slurry was dried and thermally treated to thereby form a catalyst electrode. The content of the catalyst contained in the catalyst layer of the catalyst electrode was 0.05 $mg/cm^2$ per unit area.

A membrane-electrode assembly was fabricated by joining two catalyst electrodes which were fabricated as set forth above and a poly(perfluorosulfonic acid) electrolyte membrane. Herein, the catalyst layers of the catalyst electrodes were positioned to contact both sides of the electrolyte membrane.

On both sides of the above fabricated membrane-electrode assembly, separators having a flow channel were attached to thereby fabricate a fuel cell.

Figure 7:
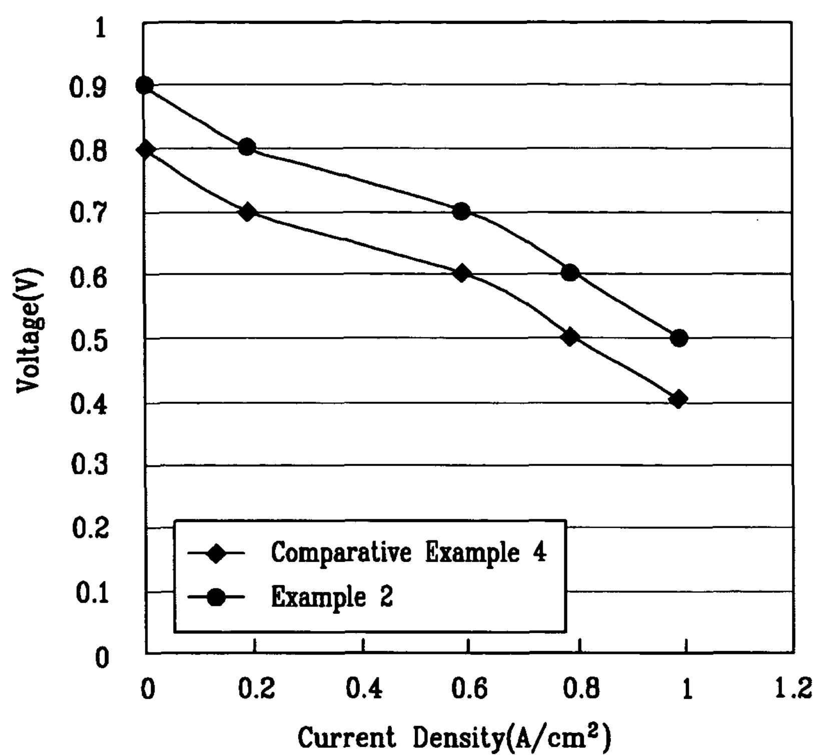
FIG. 7 is a graph showing voltage and a current density of fuel cells fabricated in accordance with Example 2 and Comparative Example 4.

With respect to the fuel cells fabricated in accordance with Example 2 and Comparative Example 4, voltage and current density were measured and the results are given in FIG. 7. As can be seen from the results, the membrane-electrode assembly comprising the electrode for a fuel cell fabricated in accordance with the second embodiment has excellent reactivity even with a small quantity of catalyst.

What is claimed is:

1. An electrode for a fuel cell comprising an electrode substrate and a catalyst layer, the catalyst layer comprising:

filler particles on a surface of the electrode substrate, wherein the filler particles comprise particles selected from the group consisting of graphite; nanocarbon having a diameter from 30 to 500 nm, the nanocarbon comprising carbon nanotubes; inorganic particles selected from the group consisting of alumina, silica, and combinations thereof; and combinations thereof;

a polymer network on a surface of the filler particles, the polymer network defining a plurality of spaces; and catalyst particles in at least some of the spaces of the polymer network, wherein the catalyst particles are present in an amount of about 0.1 $mg/cm^2$ to 0.4 $mg/cm^2$ per unit surface area.

2. The electrode according to claim 1, wherein the catalyst particles comprise a catalyst selected from the group consisting of platinum; ruthenium; osmium; platinum-ruthenium alloys; platinum-osmium alloys; platinum-palladium alloys; platinum-M alloys where M is a transition metal selected from the group consisting of Ga, Ti, V, Cr, Mn, Fe, Co, Ni, Cu, Zn, and combinations thereof and combinations thereof.

3. The electrode according to claim 1, wherein the catalyst particles have an average diameter from 1 to 1,000 nm.

4. The electrode according to claim 1, wherein the filler particles comprise inorganic particles selected from the group consisting of alumina, silica, and combinations thereof.

5. The electrode according to claim 1, wherein the polymer network comprises a binder resin selected from the group consisting of fluorine-based binder resins, benzimidazole-based binder resins, ketone-based binder resins, ester-based binder resins, amide-based binder resins, and imide-based binder resins.

6. The electrode according to claim 5, wherein the polymer network comprises a material selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), poly(2,5-benzimidazole), and combinations thereof.

7. A method for fabricating an electrode for a fuel cell, comprising:

forming a filler layer on a surface of an electrode substrate by wet coating the surface of the electrode substrate with nanocarbon having a diameter from 30 to 500 nm, wherein the nanocarbon comprises carbon nanotubes; and forming a catalyst layer on a surface of the filler layer by coating the filler layer with catalyst particles, wherein the catalyst particles are coated on the filler layer in an amount of about 0.1 $mg/cm^2$ to about 0.5 $mg/cm^2$ per unit surface area.

8. The method according to claim 7, wherein the filler layer has a thickness from 0.05 μm to 10 μm.

9. The method according to claim 7, wherein the catalyst is selected from the group consisting of platinum; ruthenium; osmium; platinum-ruthenium alloys; platinum-osmium alloys; platinum-palladium alloys, platinum-M alloy where M is a transition metal selected from the group consisting of Ga, Ti, V, Cr, Mn, Fe, Co, Ni, Cu, Zn, and combinations thereof; and combinations thereof.

10. A method for fabricating an electrode for a fuel cell, comprising:

forming a polymer network defining a plurality of spaces on an electrode substrate by mixing a plurality of filler particles with a binder resin to form a mixture, coating one side of the electrode substrate with the mixture to form a coated electrode substrate, drying the coated electrode substrate, and thermally treating the coated electrode substrate, wherein the filler particles comprise particles selected from the group consisting of graphite; nanocarbon having a diameter from 30 to 500 nm, the nanocarbon comprising carbon nanotubes; inorganic particles selected from the group consisting of alumina, silica, and combinations thereof; and combinations thereof; and filling at least some of the spaces of the polymer network with catalyst particles to form a catalyst layer on the electrode substrate, wherein the catalyst particles are added in an amount of about 0.1 $mg/cm^2$ to 0.4 $mg/cm^2$ per unit surface area.

11. The method according to claim 10, wherein the polymer network comprises a binder resin selected from the group consisting of fluorine-based binder resins, benzimidazole-based binder resins, ketone-based binder resins, ester-based binder resins, amide-based binder resins, imide-based binder resins, and combinations thereof.

12. The method according to claim 11, wherein the polymer network comprises a material selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, arylketones, poly(2,2'-(m-phenylene)-5,5'-bibenzimidazole), poly(2,5-benzimidazole), and combinations thereof.

13. The electrode according to claim 10, wherein the filler particles comprise carbon particles selected from the group consisting of graphite, nanocarbon, and combinations thereof.

14. The electrode according to claim 10, wherein the filler particles comprise inorganic particles selected from the group consisting of alumina, silica, and combinations thereof.

15. The method according to claim 10, wherein the catalyst particles comprise a material selected from the group consisting of platinum; ruthenium; osmium; platinum-ruthenium alloys; platinum-osmium alloys; platinum-palladium alloys; platinum-M alloys where M is a transition metal selected from the group consisting of Ga, Ti, V, Cr, Mn, Fe, Co, Ni, Cu, Zn, and combinations thereof; and combinations thereof.

16. The method according to claim 10, wherein the catalyst particles have an average diameter from 1 to 1,000 nm.

* * * * *